United States Patent [19]

Wakefield

[11] Patent Number: 4,863,243

[45] Date of Patent: Sep. 5, 1989

[54] MOUNT FOR AN OPTICAL ELEMENT INCLUDING A HOLDER WITH A GENERALLY SEMICYLINDRICAL SURFACE

[75] Inventor: Edward H. Wakefield, Rochester, N.Y.

[73] Assignee: Eastman Kodak Company, Rochester, N.Y.

[21] Appl. No.: 191,679

[22] Filed: May 9, 1988

[51] Int. Cl.⁴ .................... G02B 7/00; G02B 7/18
[52] U.S. Cl. .................... 350/321; 350/636; 350/634; 248/487
[58] Field of Search ............ 350/632, 633, 634, 636, 350/486, 287, 321, 252; 372/107; 248/476, 481–483, 486, 487

[56] References Cited

U.S. PATENT DOCUMENTS

| | | | |
|---|---|---|---|
| 3,357,268 | 12/1967 | Richter | 74/89 |
| 3,478,608 | 11/1969 | Met | 74/89 |
| 3,588,025 | 1/1971 | Gersman | 248/481 |
| 3,642,353 | 2/1972 | Field | 350/634 |
| 4,171,902 | 10/1979 | Imai et al. | 355/11 |
| 4,298,248 | 11/1981 | Lapp | 350/310 |
| 4,560,244 | 12/1985 | Ackerman | 350/486 |
| 4,563,058 | 1/1986 | Yardy | 350/166 |
| 4,655,548 | 4/1987 | Jue | 350/634 |
| 4,705,369 | 11/1987 | Humpal | 350/636 |

FOREIGN PATENT DOCUMENTS 1315922 6/1987 U.S.S.R. .................... 350/321

Primary Examiner—Jon W. Henry
Attorney, Agent, or Firm—Donald D. Schaper

[57] ABSTRACT

A mount for an optical device is disclosed in which a circular mirror can be adjusted relative to an optical axis. The mirror is supported along the optical axis in a holder which can be moved about orthogonal axes to provide adjustment in two rotational degrees of freedom. In order to provide a mount which can be easily adjusted and can be securely held in an adjusted position, independent support means are provided for each rotational degree of freedom, and the support means are adjustable to position an output beam from the mirror within the confines of a square cone.

5 Claims, 2 Drawing Sheets

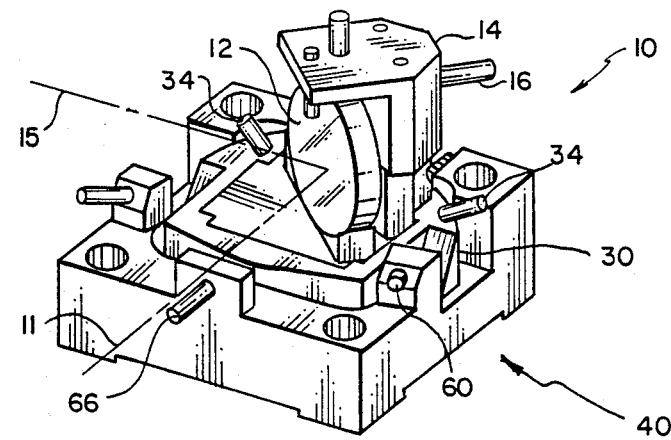
FIG. 1
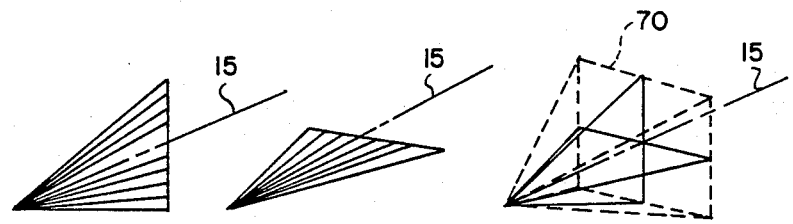
| VERTICAL DEFLECTION | HORIZONTAL DEFLECTION | COMBINED EFFECT OF HORIZONTAL & VERTICAL DEFLECTION |
|---|---|---|
| FIG. 3a | FIG. 3b | FIG. 3c |

MOUNT FOR AN OPTICAL ELEMENT INCLUDING A HOLDER WITH A GENERALLY SEMICYLINDRICAL SURFACE

CROSS REFERENCE TO RELATED APPLICATION

Reference is made to commonly-assigned U.S. application, Ser. No. 191,524, entitled Mount for an Optical Element, filed in the name of M. Gross, on even date herewith.

BACKGROUND OF THE INVENTION

1. Field of the Invention

The present invention relates to a mount for an optical element, and more particularly, to such a mount which can be adjusted to accurately position an optical element in optical apparatus.

2. State of the Prior Art

Optical elements must be very accurately positioned in certain types of apparatus such as apparatus using lasers as a light source. Mounts for the optical elements must be adjustable in order to position the element relative to a laser beam and to compensate for changes in the optical system. The optical elements must also be able to withstand shock and vibration without moving from an adjusted position, and thus, the mounts must include means for locking the optical elements in an adjusted position without inducing distortion or strain in the optical element. One of the main problems in prior-art mounts for optical elements is that the mounts cannot be easily adjusted to a precise position. A further problem with known mounts is that they cannot be locked after adjustment without changing the adjusted position.

In U.S. Pat. No. 4,563,058, there is shown a mount for a dichroic mirror in a transducer for an optical signal recorder. The dichroic mirror includes a hemispherical portion and a planar optical surface. The hemispherical portion of the mirror is received in a hemispherical socket in the mount, and an aperture plate is placed over a portion of the optical surface of the mirror to secure the mirror in the socket. The aperture plate is held in position by four screws. The mirror can be adjusted about orthogonal axes by adjusting the screws holding the aperture plate. A problem with the mount disclosed in this patent is that it is difficult to maintain an adjustment made about one of the axes while an adjustment is being made about the other axis.

SUMMARY OF THE INVENTION

It is an object of the present invention to overcome the problems in the prior art noted above and to provide an improved mount for an optical element.

In accordance with one aspect of the present invention, there is provided a mount for an optical element, the mount being adjustable to position the element relative to an optical axis, the element being adapted to receive an input light beam along the axis and to direct an output light beam away from the element, the mount comprising: a holder for the optical element; first means for supporting the holder for rotation about the optical axis, the holder upon rotation moving the output beam along a first generally straight line; and second means for supporting the first means for rotation about a second axis generally perpendicular to the optical axis, the first means upon rotation moving the output beam along a second generally straight line perpendicular to the first straight line whereby the output beam can be positioned within the confines of a rectangular cone by rotation of the holder and the first means.

In one embodiment of the present invention, a mount is adapted to support a circular mirror, and the angular position of the mirror can be adjusted in two rotational degrees of freedom. The circular mirror is mounted in a holder which is supported in a plate for pivotal movement about the optical axis. The plate is supported in a base for pivotal movement about a generally vertical axis. Both the holder and the plate can be independently adjusted to move the mirror to a desired position, and means are provided for locking the holder and the plate in adjusted positions.

One advantage of the present invention is that a first adjustment can be made in one rotational degree of freedom and the mount can be locked in the adjusted position, and then, a second adjustment can be made in another rotational degree of freedom without in any way changing the angular position of the first adjustment. In each rotational degree of freedom, the optical element is adjusted such that an output beam from the element is moved along a generally straight line. Another advantage of the present invention is that an optical element can be adjusted around a pivot point on a surface thereof regardless of the thickness of the element; this permits the adjustment of the angle at which a beam is reflected from the element without changing the position of the point of reflection. The disclosed mount can be used in a variety of applications due to its compact design, and the mount is very resistant to vibration and shock.

Other features and advantages will become apparent with reference to the following Description of the Preferred Embodiments when read in light of the attached drawings.

BRIEF DESCRIPTION OF THE DRAWINGS

FIG. 1 is a perspective view of the mount of the present invention;

FIGS. 3A–3C are diagrammatic illustrations of the range of adjusted positions of a beam which can be achieved in the disclosed mount.

DESCRIPTION OF PREFERRED EMBODIMENT

Figure 2:
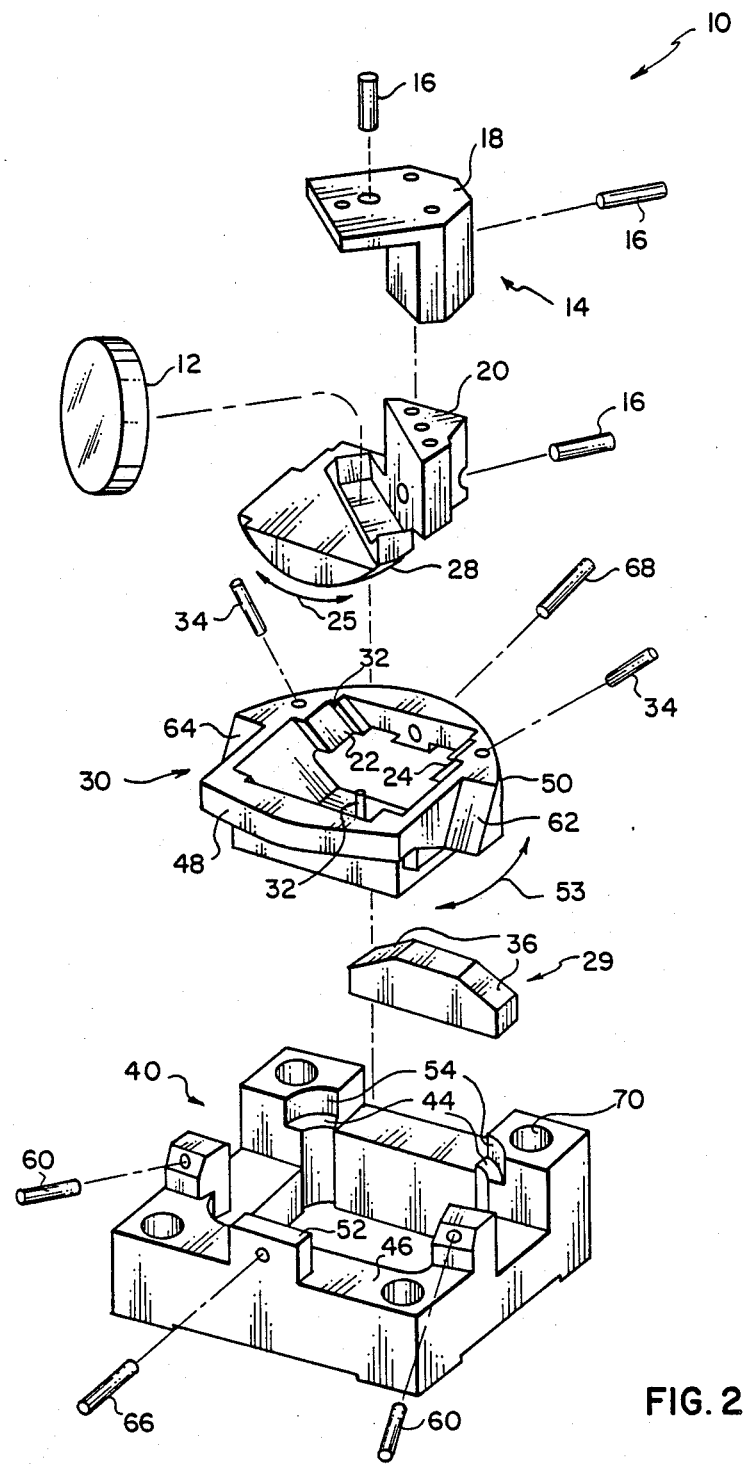
FIG. 2 is an exploded perspective view of the mount shown in FIG. 1.

The mount of the present invention is described herein as being for a mirror. It will be apparent, however, that the mount could be used for other optical elements, for example, a prism. The mount of the present invention is useful in optical apparatus, such as a laser printer, where very high precision is required. References herein to terms such as "up," "down," "vertical," and "horizontal," refer to the present invention in the orientation shown in FIG. 1.

In FIGS. 1 and 2, there is shown a mount 10 for a circular mirror 12 which is supported therein along an optical axis 11 of, for example, an input beam of light. As will be discussed hereinafter, mirror 12 can be adjusted to determine the optical axis 15 of a beam reflected from mirror 12. Mirror 12 is supported in a holder 14 such that an operative surface 17 of the mirror 12 is disposed at an angle of 45° to axis 11, and the mirror 12 is held in holder 14 by spring-loaded screws 16 of a well-known type. As shown in FIG. 2, holder 14 is separable into a top portion 18 and a bottom portion 20 to permit easy insertion of mirror 12. Portions 18 and 20 are held together by fasteners (not shown).

Bottom portion 20 of holder 14 has a generally semicylindrical surface 28 which is shaped to cooperate with cylindrical bearing surfaces 22 and 24 in a plate 30. Holder 14 is adapted to pivot in plate 30 to provide a vertical deflection adjustment of mirror 12 and thereby locate the axis 15 of an output beam along a generally vertical line, as shown diagrammatically in FIGS. 3A and 3C. Holder 14 is pivotal about optical axis 11, the directions of pivotal movement being indicated by the arrows 25. Holder 14 is constrained from movement in an axial direction by a pin 32 on plate 30 which is received in a groove (not shown) in surface 28. In the assembly of mount 10, holder 14 is inserted in plate 30, and an adjustment bar 29 having shoulders 36 thereon is fastened to bottom portion 20 of holder 14. Holder 14 can be adjusted to a desired angular position by means of set screws 34 which are threaded in plate 30 and abut against shoulders 36 of adjustment bar 29. It will be seen that angular adjustment of holder 14 can be effected by backing off one of the screws 34 a certain distance while the other of the screws 34 is advanced an equal distance. A locking screw 68 is provided to lock holder 14 in an adjusted position.

Plate 30 is received in a base 40 and is supported in a vertical direction by surfaces 44 and a raised portion (not shown) of surface 46 on the base 40. Cylindrical end portions 48 and 50 on plate 30 are adapted to cooperate, respectively, with cylindrical surfaces 52 and 54 on base 40 to provide for pivotal movement of plate 30 about a vertical axis (not shown). Pivotal movement of plate 30 about a vertical axis (indicated by arrows 53 in FIG. 2) provides a horizontal deflection adjustment of mirror 12 to move the axis 15 of an output beam along a generally horizontal line, as shown diagrammatically in FIGS. 3B and 3C. Angular movement of plate 30 is effected by set screws 60 which are threaded in base 40 and abut against surfaces 62 and 64 on plate 30. One of the screws 60 is advanced a given amount while the other is backed off the same amount to effect movement of plate 30 to an adjusted position. When plate 30 has been moved to a desired position, a locking screw 66 is tightened against surface 48 to lock plate 30 in position.

In the use of mount 10 in optical apparatus (not shown), the mount is secured in the apparatus by means of fasteners (not shown) inserted in holes 70. Mount 10 is located so that mirror 12 will receive a light beam along optical axis 11. Both vertical and horizontal deflection adjustments are then made, as described above, to precisely locate axis 15 of a beam reflected from mirror 12. Thus, in a first step, holder 14 is rotated by means of screws 34 to make the horizontal deflection adjustment, and the holder 14 is locked in the adjusted position by screw 68. In a second step, plate 30 is positioned by means of screws 60 to make the horizontal deflection adjustment, and the plate 30 is locked in the adjusted position by screw 66. The two adjustments position a reflected beam, with very high resolution, within the confines of a square cone 70 which is shown diagrammatically in FIG. 3C.

The invention has been described in detail with particular reference to a preferred embodiment thereof, but it will be understood that variations and modifications can be effected within the spirit and scope of the invention.

I claim:

1. A mount for an optical element, said mount being adjustable to position said element relative to an optical axis, said element being adapted to receive an input light beam along said axis and to direct an output light beam away from the element, said mount comprising:

a holder for said optical element, said holder having a generally semicylindrical surface portion;

first means for supporting said holder for rotation about said optical axis, said first means having generally cylindrical end portions and a generally cylindrical bearing surface which cooperates with said surface portion, said holder upon rotation moving said output beam along a first generally straight line; and second means for supporting said first means for rotation about a second axis generally perpendicular to said optical axis, said second means being adapted to receive said end portions for rotational movement therein, said first means upon rotation moving said output beam along a second generally straight line perpendicular to said first straight line whereby said output beam can be positioned within the confines of a rectangular cone by rotation of said holder and said first means.

2. A mount, as defined in claim 1, wherein said element is supported in said holder such that an operative surface of the element is disposed at a 45 degree angle to said optical axis.

3. A mount, as defined in claim 1, wherein first adjusting means is provided for rotating said holder in said first means and for locking said holder in an adjusted position.

4. A mount, as defined in claim 1, wherein second adjusting means is provided for rotating said first means in said second means and for locking said first means in an adjusted position.

5. A mount, as defined in claim 1, wherein said semicylindrical surface portion and said cylindrical end portions are disposed about orthogonal axes.

* * * * *